United States Patent
Tang (10) Patent No.: US 8,631,098 B2
(45) Date of Patent: Jan. 14, 2014

(54) RESOURCE CONFIGURATION METHOD, SERVER, NETWORK EQUIPMENT AND NETWORK SYSTEM

(75) Inventor: Lei Tang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 551 days.

(21) Appl. No.: 12/545,489

(22) Filed: Aug. 21, 2009

(65) Prior Publication Data

US 2009/0327455 A1    Dec. 31, 2009

Related U.S. Application Data

(63) Continuation of application No. PCT/CN2008/073909, filed on Dec. 31, 2008.

(30) Foreign Application Priority Data

Jun. 28, 2008    (CN) .......................... 2008 1 0029173

(51) Int. Cl.
*G06F 15/177* (2006.01)
*G06F 15/173* (2006.01)

(52) U.S. Cl.
USPC ........... 709/220; 709/221; 709/222; 709/224; 709/226

(58) Field of Classification Search
USPC ................................. 709/220–222, 224, 226
See application file for complete search history.

(56) References Cited

U.S. PATENT DOCUMENTS

| | | | | |
|---|---|---|---|---|
| 5,619,716 A | * | 4/1997 | Nonaka et al. | 717/167 |
| 5,812,748 A | * | 9/1998 | Ohran et al. | 714/4.5 |
| 5,974,461 A | * | 10/1999 | Goldman et al. | 709/224 |
| 6,044,399 A | * | 3/2000 | Elledge | 709/220 |
| 6,614,781 B1 | * | 9/2003 | Elliott et al. | 370/352 |
| 6,628,763 B1 | * | 9/2003 | Mani | 379/93.35 |

(Continued)

FOREIGN PATENT DOCUMENTS

| | | |
|---|---|---|
| CN | 1474527 A | 2/2004 |
| CN | 1489069 A | 4/2004 |

(Continued)

OTHER PUBLICATIONS

Written Opinion of the International Searching Authority in corresponding PCT Application No. PCT/CN2008/073909 (Mar. 26, 2009).

(Continued)

*Primary Examiner* — David Lazaro
*Assistant Examiner* — Farzana Huq
(74) *Attorney, Agent, or Firm* — Leydig, Voit & Mayer, Ltd.

(57) ABSTRACT

A resource configuration method, a server, a network equipment, and a network system are provided. The resource configuration method includes performing a resource configuration on a network equipment according to a resource requirement of the network equipment and updated resource configuration information. The resource configuration information includes resource registration information reported by each of network equipments in a network. By implementing the present invention, the number of lookups for the resources is reduced and the process thereof is shortened, thereby achieving an effective resource allocation. In the case that an update frequency is fast enough, a search for resources is realized by one lookup. With such dynamic resource configuration information, the resource allocation is performed quickly and the waste of processing capacity of the server is avoided effectively.

12 Claims, 3 Drawing Sheets

(56) References Cited

U.S. PATENT DOCUMENTS

| | | |
|---|---|---|
| 7,089,297 B1 | 8/2006 | Salas et al. |
| 2002/0120744 A1 | 8/2002 | Chellis et al. |
| 2003/0172163 A1* | 9/2003 | Fujita et al. ............ 709/226 |
| 2005/0228855 A1 | 10/2005 | Kawato |
| 2006/0165224 A1 | 7/2006 | Lee |
| 2006/0168224 A1 | 7/2006 | Midgley |
| 2008/0010377 A1* | 1/2008 | Nissennboim ............ 709/226 |
| 2008/0110377 A1* | 5/2008 | Stevens ................ 108/51.11 |
| 2008/0311896 A1* | 12/2008 | Karaoguz et al. ......... 455/416 |
| 2009/0182878 A1* | 7/2009 | Streijl ..................... 709/226 |
| 2009/0325602 A1* | 12/2009 | Higgins et al. ......... 455/456.2 |

FOREIGN PATENT DOCUMENTS

| | | |
|---|---|---|
| CN | 1679300 A | 10/2005 |
| CN | 1738244 A | 2/2006 |
| CN | 1832448 A | 9/2006 |
| CN | 101304330 A | 11/2008 |

OTHER PUBLICATIONS

International Search Report in corresponding PCT Application No. PCT/CN2008/073909 (Mar. 26, 2009).

* cited by examiner

RESOURCE CONFIGURATION METHOD, SERVER, NETWORK EQUIPMENT AND NETWORK SYSTEM

CROSS-REFERENCE TO RELATED APPLICATIONS

This application is a continuation of International Patent Application No. PCT/CN2008/073909, filed Dec. 31, 2008, which claims priority to Chinese Patent Application No. 200810029173.0, filed Jun. 28, 2008, both of which are hereby incorporated by reference in their entireties.

TECHNICAL FIELD

The present invention relates to the field of communications, and more particularly to a resource configuration method, a server, a network equipment and a network system.

BACKGROUND ART

In order to solve the disadvantages of small service scope and low resource utilization in the conventional circuit domain switching times, the packet domain switching method occurs. This method also establishes communication switching points, for example, network equipments such as multi-point private branch exchanges (PBXs) and multi-point call centers, at different places. Unlike the conventional circuit domain switching method, the communication switching points of the packet domain switching are connected via an Internet protocol (IP) network. The network equipment at the communication switching points are connected to each other via the IP network, and thus a media stream among the network equipments at the points may be delivered via a voice over Internet protocol (VOIP) so as to truly realize the cross-regional services. Meanwhile, the resources deployed in the network equipment at each communication switching point may serve the network equipments at other points via the IP network. In this manner, resources may be allocated via the IP network so as to improve the utilization efficiency thereof.

Figure 1:
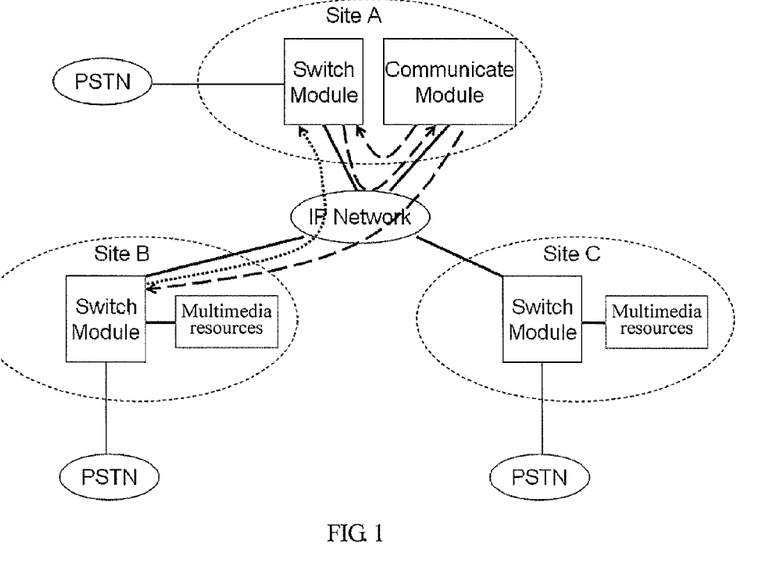
FIG. 1 is a schematic view of a resource configuration by employing a static resource configuration table in a server.

In order to realize the resource allocation, the conventional art employs a specialized server to configure a unified resource configuration table. Referring to FIG. 1, a server is disposed at a communication switching point which is relatively safe and a unified resource configuration table is configured on the server. In combination with FIG. 1, this method specifically includes the following steps.

A resource configuration table is preset in a server. The resource configuration table may not change upon configuration and needs to be reset manually for the next update.

The network equipment at the communication switching point A sends the resource requirement request to the server.

After receiving the resource requirement request sent by the network equipment at the communication switching point A, the server looks up the resource configuration table configured in the server to acquire an ID of the network equipment at the communication switching point B having the desired resources.

The server then sends the resource requirement request to the network equipment at the communication switching point B.

After receiving the resource requirement request sent by the server, the network equipment at the communication switching point B checks whether itself has exactly the requested idle resources or not. If the network equipment has exactly the requested idle resources, it returns a "Request Successful" response to the server, packetizes the resources with a compression algorithm, and directly sends the resources to the network equipment at the communication switching point A for application in the form of IP data packets. Otherwise, it returns a "Request Failed" response to the server.

On receiving the "Request Failed" response, the server continues looking up the resource configuration table till it obtains the required resources or does not obtain the required resources after searching the communication switching points in the entire network.

In the process of implementing the invention, the inventor found that the conventional art at least has the following disadvantages. As shown in FIG. 1, the conventional art employs the static resource configuration table which needs to be manually pre-configured and updated periodically, so that resource registration information at each communication switching point cannot be updated in time. After the network equipment at the communication switching point A sends the resource requirement request to the server, the server can find out that the network equipment at the communication switching point B has the resources required by the network equipment at the communication switching point A. After receiving the resource requirement request sent by the sever, if the network equipment at the communication switching point B finds out that it does not have the requested idle resources, it returns the "Request Failed" response to the server, and the server needs to initiate the resource requirement request to all the other communication switching points in the network in turn. This method affects the speed of the resource allocation, causes inconvenience to the user, and greatly wastes the processing capacity of the server.

SUMMARY

Accordingly, embodiments of the invention are directed to a resource configuration method, a server, a network equipment, and a network system, capable of implementing an allocation of network resources rapidly and effectively.

A resource configuration method is provided in an embodiment of the invention. The method includes the following steps.

A resource configuration is performed on a network equipment according to a resource requirement request of the network equipment and updated resource configuration information. The resource configuration information includes resource registration information reported by each of network equipments in a network.

Accordingly, a server is provided in an embodiment of the invention. The server includes a resource update unit and a configuration control unit.

The resource update unit automatically updates resource configuration information of the server itself according to resource registration information reported by each of network equipments in a network.

The configuration control unit performs a resource configuration on a network equipment according to a resource requirement request of the network equipment and the resource configuration information updated by the resource update unit.

Accordingly, a network equipment is provided in an embodiment of the invention. The network equipment includes a detection unit and a sending unit.

The detection unit detects whether a triggering condition for reporting resource registration information is reached or not.

The sending unit reports the resource registration information of the network equipment to a server when the triggering condition is reached.

Accordingly, a network system is provided in an embodiment of the invention. The network system includes a server and a network equipment.

The server performs a resource configuration on the network equipment according to a resource requirement request of the network equipment in a network and updated resource configuration information. The resource configuration information includes resource registration information reported by each of the network equipments in the network.

The network equipment sends resource registration information of the present equipment to the server, or send a resource requirement request to the server, or send resources to another network equipment according to resource configuration indication information of the server.

The server according to the embodiment of the invention performs a resource configuration on a network equipment according to a resource requirement of the network equipment in the network and updated resource configuration information. As all the resource configuration information on the server is updated resource configuration information at each resource configuration, by implementing the embodiment of the invention, the number of lookups for the resources is reduced and the process thereof is shortened, thereby achieving an effective resource allocation. In the case that an update frequency is fast enough, a search for resources is realized by one lookup. With such dynamic resource configuration information, the resource allocation is performed quickly and the waste of processing capacity of the server is avoided effectively.

DETAILED DESCRIPTION

The technical schemes of the invention will be described clearly and completely with the accompanying drawings in the embodiments of the invention. It is obvious that the provided embodiments are merely a part of and not the whole of the embodiments of the invention. Based on the embodiments of the invention, other embodiments obtained by those of ordinary skill in the art without making creative efforts all fall within the scope of the invention.

In order to make the objectives, technical schemes, and advantages of the invention comprehensible, the embodiments of the invention are illustrated in detail below with the accompanying drawings.

Figure 2:
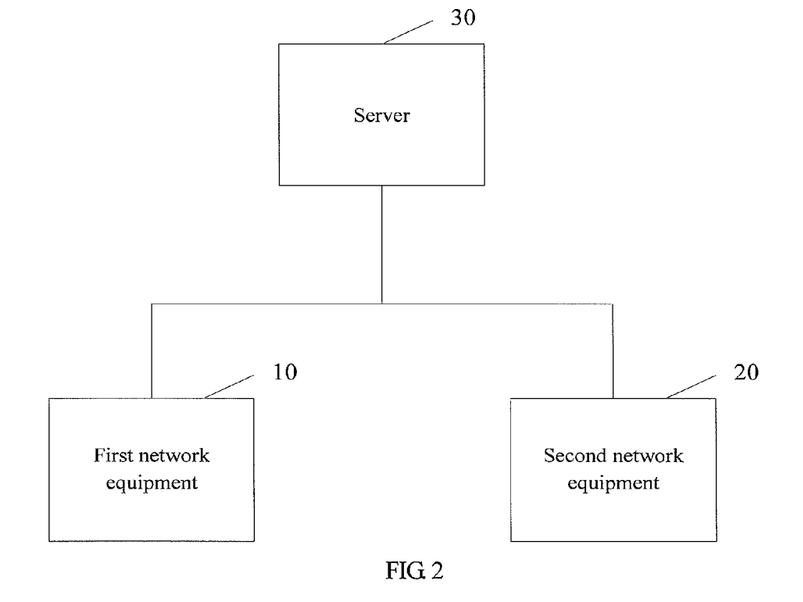
FIG. 2 is a schematic view of a system for realizing a resource configuration according to an embodiment of the invention.

In a network, a server may communicate with and be connected to multiple network equipments. Each of the network equipments may have the same operating mode, function, and structure. For ease of description, a case that two network equipments communicate with and are connected to the server is illustrated in the embodiments of the invention. FIG. 2 is a schematic view of a system for realizing a resource configuration according to an embodiment of the invention. The system includes a first network equipment 10, a second network equipment 20, and a server 30. The first network equipment 10, the second network equipment 20, and the server 30 are connected via an IP network. The server 30 dynamically and automatically updates resource configuration information of the server 30 itself according to resource registration information reported by each of the network equipments. The resource configuration information includes resource registration information contained in each of the network equipments in the network and may be in the form of a file, a database table, or the like. The first network equipment 10 and the second network equipment 20 report the resource registration information to the server 30, or send resource requirement requests to the server 30, or send resources to another network equipment according to resource configuration indication information of the server 30. The resource registration information includes a resource type, resource availability, a network equipment ID and so on. The resource availability is information content capable of judging whether a certain type of resources is currently idle or not, such as the quantity of the resources, percentage of resource idleness, and resource idle identification. The resource type includes sound, fax, conference, video, picture and the like. The resource registration information is reported to the server 30 after the network equipment reaches a certain triggering condition for reporting. The triggering condition includes the following circumstances.

The resources contained in the network equipment change. The resource change refers to that the resources currently contained in the network equipment have a change to a certain extent relative to the resource registration information reported last time, for example, a change of the quantity of the resources, a change of the resource percentage, a change of a resource status from idle to occupied, or the like. When reaching a reporting period or time point for the resource registration information set in the network equipment, the reporting period for the resource registration information may be preset in the network equipment, for example, the network equipment is set to send the resource registration information to the server at every 100 ms. The time may also be preset in the network equipment. For example, the network equipment is set to send the resource registration information to the server at 12 o'clock every day. The two setting modes may exist at the same time. For example, the network equipment sends the resource registration information to the server at 12 o'clock every day with an interval of 100 ms.

When the network equipment receives a request that requires to report the resource registration information of the network equipment, for example, after the network equipment receives a request sent by the server that requires the network equipment to report a resource possession condition of the network equipment, the network equipment reports the resource registration information. Specifically, the server may send the request to the network equipment according to a period or time point. The reporting period for the resource registration information may be preset in the network equipment, for example, the network equipment is set to send the resource registration information to the server at every 100 ms. The time may also be preset in the network equipment. For example, the network equipment is set to send the resource registration information to the server at 12 o'clock every day. The two setting modes may exist at the same time.

For example, the network equipment sends the resource registration information to the server at 12 o'clock every day with an interval of 100 ms.

When receiving the resource registration information reported by the network equipment, the server 30 judges whether the received resource registration information is contained in the current resource configuration information or not, and if not, the server 30 updates the resource configuration information of the server 30 itself. Otherwise, the server 30 does not perform the update. It is understood that, the server may also directly update a resource configuration table without performing any judgment after receiving the resource registration information reported by the network equipment.

The invention is illustrated below by making the first network equipment 10 serve as a requesting equipment that sends a resource requirement request in the system as an example.

When the first network equipment 10 is not deployed with or has already exhausted resources required by a client, the first network equipment 10 sends a resource request to the server 30. The resource request includes a requested resource type, a requested quantity of resources, and an ID of the first network equipment.

When receiving the resource requirement request sent by the first network equipment 10, the server 30 looks up currently stored resource configuration information to judge whether any network equipment in the network possesses the resources of the request. The lookup includes a linear table lookup, a Hash table lookup, an SQL relation database table lookup and so on. After finding that the second network equipment 20 possessing the resources of the request exists in the network, the server 30 returns a request successful response to the first network equipment 10, meanwhile marks an availability of the resources of the second network equipment 20 (the marking indicates that the resources are occupied) and initiates to the second network equipment 20 containing the resources a configuration control message that the resource registration information needs to be sent to the first network equipment 10. Otherwise, the server 30 sends a request failed message to the first network equipment 10.

When receiving the configuration control message sent by the server 30, the second network equipment 20 packetizes the resources required by the first network equipment 10 with a compression algorithm and sends the resources to the first network equipment 10 through standard VOIP protocol communication in the form of IP data packets. The VOIP protocol communication includes session initiation protocol (SIP), H.323, media gateway control protocol (MGCP), H.248 and so on. Local resources may also be set in the second network equipment 20, and the purpose thereof is mainly to ensure local communication. On the premise that the local communication is ensured, resources are provided to other network equipments for use of the communication thereof. For example, a certain kind of resources of which the quantity is five is set in the network equipment through identification or by other setting methods. Then, the five resources are for the use of local communication. When the quantity of this kind of resources is smaller than 5, the availability of this kind of resources in the resource message reported to the server is "null" or "occupied."

In this system, the first network equipment 10 serves as a resource request side, and the second network equipment 20 serves as a resource providing side. However, in actual applications, the same network equipment may not send a resource requirement request to the server 30 when not deployed with or having already exhausted resources required by the client, but also provide resources to other network equipments when having idle resources.

Figure 3:
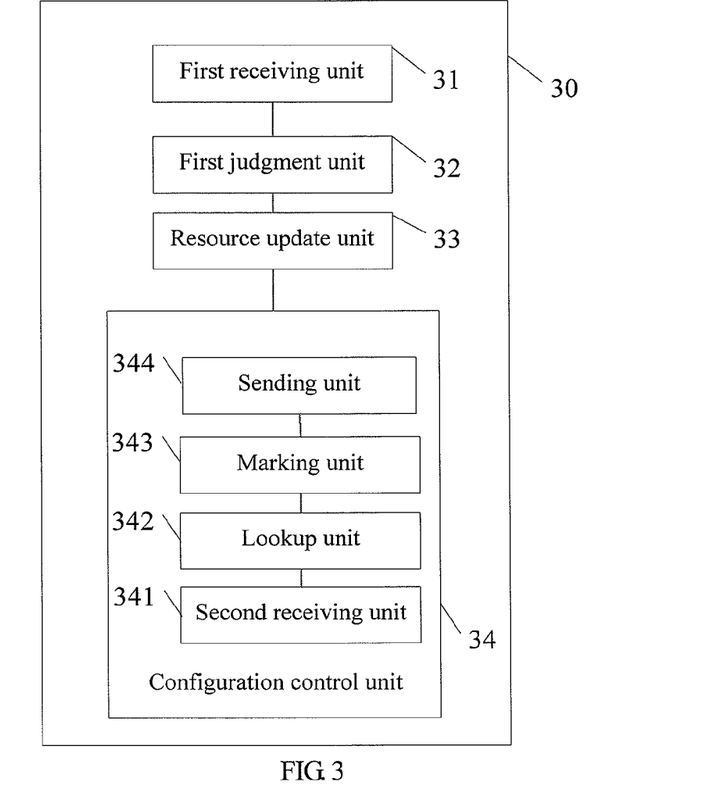
FIG. 3 is a schematic structural view of a server for realizing a resource configuration according to an embodiment of the invention.

Referring to FIG. 3, the server 30 specifically includes a first receiving unit 31, a first judgment unit 32, a resource update unit 33 and a configuration control unit 34. The first receiving unit 31, the first judgment unit 32, the resource update unit 33 and the configuration control unit 34 are connected to each other in sequence.

The first receiving unit 31 is adapted to receive the resource registration information reported by the network equipments (including the first network equipment 10 and the second network equipment 20).

The first judgment unit 32 is adapted to judge whether the resource registration information received by the first receiving unit 31 is contained in the currently stored resource configuration information or not. If it is determined that the resource registration information received by the first receiving unit 31 is contained in the currently stored resource configuration information, the current resource configuration information is maintained without being updated. If it is determined that the resource registration information received by the first receiving unit 31 is not contained in the currently stored resource configuration information, the current resource configuration information needs to be updated. It is understood that, the resource configuration table may be directly updated without determining the received resource registration information, i.e., the present judgment unit is not disposed.

The resource update unit 33 is adapted to update the resource configuration information. When the resource registration information sent by the network equipments is received and it is determined by the first judgment unit 32 that the resource registration information received by the receiving unit 31 is not contained in the currently stored resource configuration information, the resource configuration information is updated. Otherwise, the original resource configuration information is maintained. It is understood that, the resource configuration information may be directly updated without determining the received resource registration information.

The configuration control unit 34 is adapted to configure resources in the network according to a resource requirement of the first network equipment 10 and the resource configuration information updated by the resource update unit 33. The configuration control unit 34 further includes a second receiving unit 341, a lookup unit 342, a marking unit 343 and a sending unit 344. The second receiving unit 341, the lookup unit 342, the marking unit 343 and the sending unit 344 are connected to each other in sequence.

The second receiving unit 341 is adapted to receive the resource requirement request sent by the first network equipment 10. The resource requirement request information includes a resource type, a required quantity of resources, identification information of the first network equipment 10 and so on required by the first network equipment 10.

The lookup unit 342 is adapted to look up currently stored resource configuration information to judge whether any network equipment in the network possesses the resources of the request. If it is found that a network equipment possessing the resources of the request exists in the network, the sending unit 344 initiates to the network equipment a configuration control message that the resources need to be sent to the first network equipment 10. Otherwise, the sending unit 344 sends a request failed message to the first network equipment 10.

After the lookup unit 342 finds that the network equipment having the resources of the request exists in the network, the marking unit 343 is adapted to initiate to the network equipment the configuration control message that the resources need to be sent to the first network equipment 10 and mark an availability of the resources of the network equipment. The marking indicates that the resources are occupied. For example, in this embodiment, the marking indicates that the resources in the second network equipment 20 requested by the first network equipment 10 are preoccupied so as to prevent the server 30 from providing the same idle resources when other network equipments request the same type of resources which may cause insufficient resources of the network equipment that provides the resources, so that the network equipment not acquiring the required resources still needs to send a resource requirement request to the server 30 to perform a resource configuration once again, and thus confusions of the resource configuration may easily occur.

The sending unit 344 is adapted to initiate to the second network equipment 20 containing the resources the configuration control message that the resources need to be sent to the first network equipment 10 after the lookup unit 342 finds the resource registration information, and meanwhile send a request successful message to the first network equipment 10. Otherwise, it sends a request failed message to the first network equipment 10.

Figure 4:
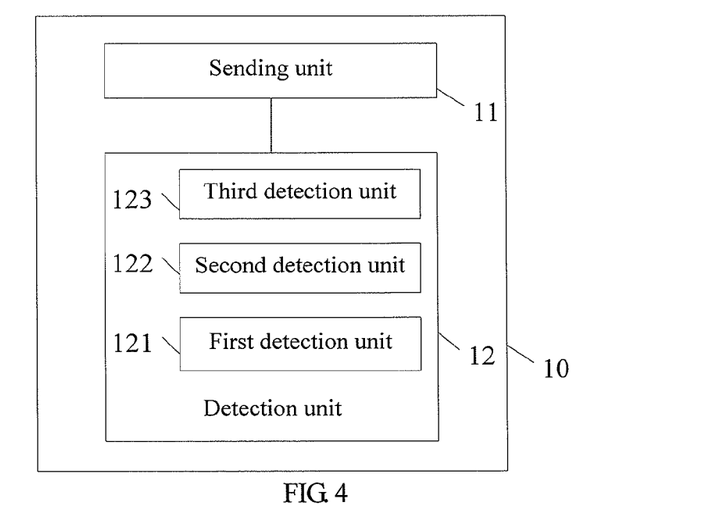
FIG. 4 is a schematic structural view of a network equipment for realizing a resource configuration according to an embodiment of the invention.

Referring to FIG. 4, the first network equipment 10 includes a sending unit 11 and a detection unit 12. The sending unit 11 and the detection unit 12 are connected to each other.

The sending unit 11 is adapted to send resource registration information of the first network equipment to the server 30, or send a resource requirement request to the server, or send resources to other network equipments. The sending the resource registration information of the first network equipment to the server is for the server to update its resource configuration information. The sending the resource requirement request of the first network equipment to the server is for the server to configure the resources in the network. The sending the resources to other network equipments is to send resources to other network equipments so as to complete the resource configuration under the control of the server.

The detection unit 12 is adapted to detect whether a triggering condition for reporting resource registration information is reached or not, and notify the sending unit 11 to report the resource registration information of the first network equipment to the server when the triggering condition is reached. The unit further includes a first detection unit 121, and/or a second detection unit 122, and/or a third detection unit 123.

The first detection unit 121 is adapted to detect whether the resource registration information of the first network equipment changes or not, and notify the sending unit 11 to report resource registration information contained in the first network equipment to the server when detecting that the resources contained in the first network equipment change. When the resource registration information in the network equipment 10 changes, for example, this part of resources changes from idle to occupied, the quantity of the resources changes, or the like, and the changes can all be detected by the first detection unit 121. If the triggering condition for reporting the resource registration information is that the resource registration information changes, the first detection unit 121 notifies the sending unit 11 to report the current resource registration information to the server when detecting that the resource registration information in the first network equipment 10 changes relative to the resource registration information reported last time.

The second detection unit 122 is adapted to detect whether a reporting period or time point for the resource registration information set in the network equipment is reached or not, and notify the sending unit 11 to report the resource indication information contained in the network equipment to the server when detecting that the reporting period or time point for the resource registration information set in the network equipment is reached. For example, the network equipment is set to send the resource registration information to the server at every 100 ms. The time is preset in the network equipment, for example, the network equipment is set to send the resource registration information to the server at 12 o'clock every day. The two setting modes may exist at the same time. For example, the network equipment sends the resource registration information to the server at 12 o'clock every day with an interval of 100 ms.

The third detection unit 123 is adapted to detect whether the network equipment receives a request that requires the network equipment to report a resource possession condition of the network equipment, and notify the sending unit 11 to report the resource registration information contained in the network equipment to the server when detecting that the network equipment receives the request. The server may send the resource update request to the network equipment according to a period or time point. The reporting period for the resource registration information is preset in the network equipment, for example, the network equipment is set to send the resource registration information to the server at every 100 ms. The time is preset in the network equipment, for example, the network equipment is set to send the resource registration information to the server at 12 o'clock every day. The two setting modes may exist at the same time. For example, the network equipment sends the resource registration information to the server at 12 o'clock every day with an interval of 100 ms.

The server according to the embodiment of the invention performs a resource configuration on a network equipment according to a resource requirement request of the network equipment in the network and updated resource configuration information. As all the resource configuration information on the server is updated resource configuration information at each resource configuration, by implementing the embodiment of the invention, the number of lookups for the resources is reduced and the process thereof is shortened, thereby achieving an effective resource allocation. In the case that an update frequency is fast enough, a search for resources is realized by one lookup. With such dynamic resource configuration information, the resource allocation is performed quickly and the waste of processing capacity of the server is avoided effectively.

Figure 5:
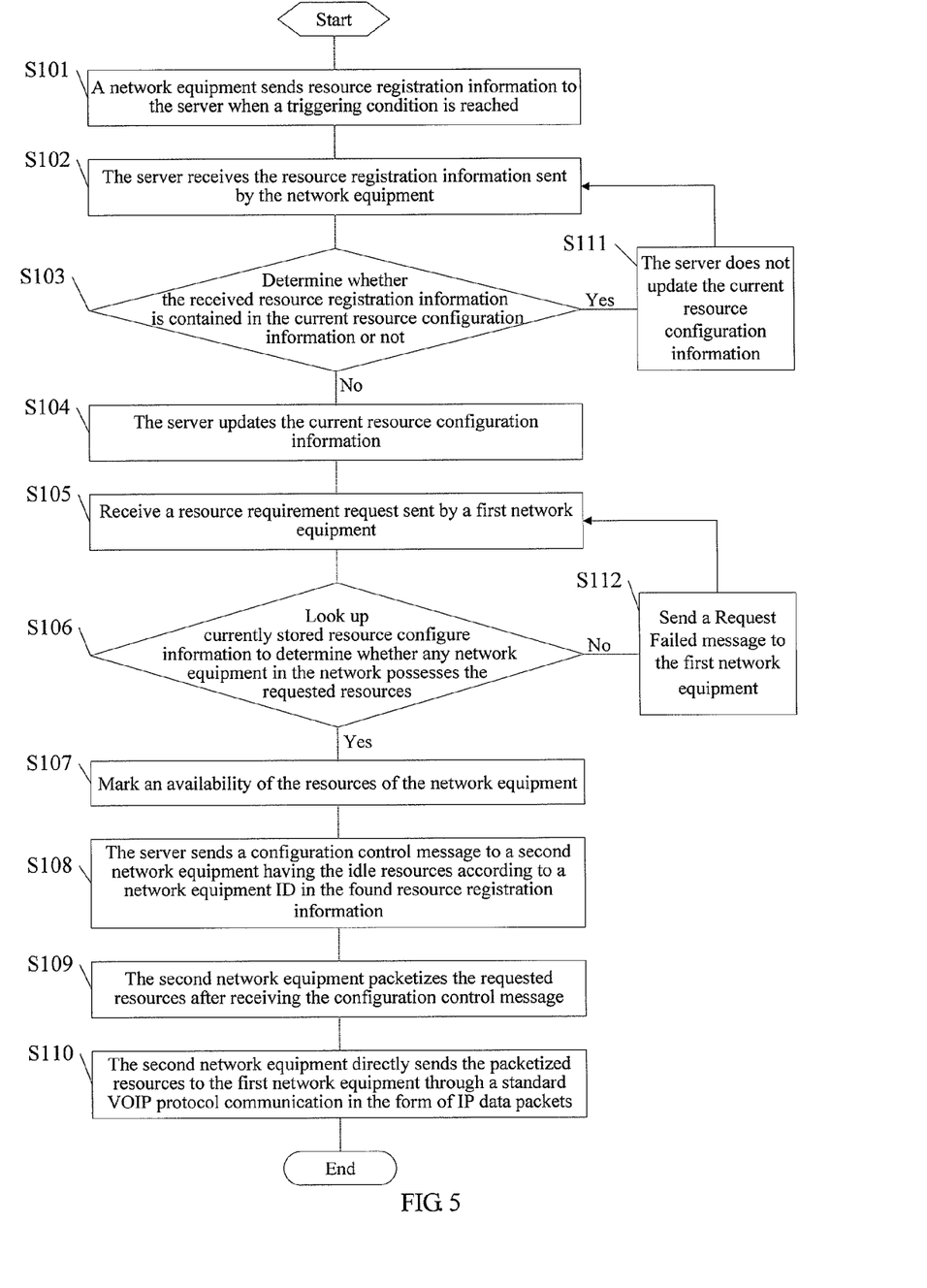
FIG. 5 is a flow chart of a method for realizing a resource configuration according to an embodiment of the invention.

FIG. 5 is a flow chart of a method for realizing a resource configuration according to an embodiment of the invention. In this embodiment, a server updates resource configuration information of the server itself according to resource registration information reported by each of network equipments so as to reduce the number of lookups for resources and shorten the process thereof, thereby achieving an effective resource allocation. In the case that the update frequency is fast enough, a search for resources is realized by one lookup. With such dynamic resource configuration information, the resource allocation is performed quickly and the waste of processing capacity of the server is avoided effectively.

The resource configuration method includes the following steps.

In Step S101, a network equipment sends resource registration information to the server when a triggering condition is reached. The resource registration information includes a resource type, resource availability, a network equipment ID, and so on. The resource availability is information content capable of determining whether a certain type of resources is currently idle or not, such as the quantity of the resources, percentage of resource idleness, and resource idle identification. The resource registration information is reported to the server after the network equipment reaches the triggering condition for reporting the resource registration information. The triggering condition includes the following:

The resources contained in the network equipment change, in which the change of the information resources refers to a change of the resources currently contained in the network equipment relative to the resource registration information reported last time to a certain extent, for example, a change of a specified quantity of resources, a change of the resource percentage, a change from idle to non-idle, and so on;

A reporting period or time point for the resource registration information set in the network equipment is reached, in which the reporting period for the resource registration information is preset in the network equipment, for example, the network equipment is set to send the resource registration information to the server at every 100 ms, and the time is preset in the network equipment, for example, the network equipment is set to send the resource registration information to the server at 12 o'clock every day, and the two setting modes may exist at the same time, for example, the network equipment sends the resource registration information to the server at 12 o'clock every day with an interval of 100 ms; and The network equipment receives a request that requires the equipment to report the resource registration information thereof, in which when the network equipment receives the request that requires the network equipment to report the resource registration information thereof, the network equipment reports the resource registration information after receiving a resource update request sent by the server. The server may send the resource update request to the network equipment according to a period or time point. The reporting period for the resource registration information is preset in the network equipment, for example, the network equipment is set to send the resource registration information to the server at every 100 ms. The time is preset in the network equipment, for example, the network equipment is set to send the resource registration information to the server at 12 o'clock every day. The two setting modes may exist at the same time. For example, the network equipment sends the resource registration information to the server at 12 o'clock every day with an interval of 100 ms.

In Step S102, the server receives the resource registration information sent by the network equipment.

In Step S103, it is determined whether the received resource registration information is contained in the current resource configuration information or not, and if not, Step S104 is performed. Otherwise, Step S111 is performed without performing the update step. In the specific implementation, after Step S111 is performed, the flow turns to Step S102. It is understood that, the server may also directly update a resource configuration table without performing any determination after receiving the resource registration information reported by the network equipment.

In Step S104, the server updates the current resource configuration information.

In Step S105, a resource requirement request sent by a first network equipment is received. If the first network equipment in the network is not deployed with or has already exhausted resources required by a client, the resource request is sent to the server. The resource requirement request includes a required resource type, required quantity of resources, and identification information of the first network equipment. The resource requirement request may also include request information about which compression mode and transmission mode are employed for the network equipment that provides the resources.

In Step S106, the currently stored resource configure information is looked up to determine whether any network equipment in the network possesses the resources of the request according to the received resource requirement request sent by the first network equipment. After receiving the resource requirement request sent by the first network equipment, the server invokes and looks up the stored resource configuration information. The lookup may be performed according to a resource type required by the first network equipment. The lookup includes a linear table lookup, a Hash table lookup, an SQL relation database table lookup, and the like.

If it is found that another network equipment has the idle resources requested by the first network equipment, a Request Successful message is sent to the first network equipment. Otherwise, Step S112 is performed in which a Request Failed message is sent to the first network equipment. In the specific implementation, after Step S112 is performed, the flow turns to Step S102 or Step S105. In the case that the update frequency is fast enough, a search for resources may be realized by one lookup, i.e., it can be known whether any other network equipment in the network has the idle resources required by the first network equipment.

In Step S107, an availability of the resources of the network equipment is marked. The marking indicates that the resources are occupied. The marking of the resource availability of this part of resource registration information in the resource configuration information indicates that the resources requested by the first network equipment are pre-occupied so as to prevent the server from providing the same idle resources when other network equipments request the same type of resources which may cause insufficient resources of the network equipment that provides the resources, so that the network equipment not acquiring the required resources still needs to send a resource requirement request to the server to perform a resource configuration once again, and thus confusions of the resource configuration may easily occur.

In Step S108, the server sends a configuration control message to a second network equipment containing the resources according to a network equipment ID contained in the found resource registration information. The server may directly control the second network equipment to send the resources required by the first network equipment to the first network equipment directly so as to complete the resource configuration. It is understood that, this step may serve as a default setting of the network and no longer needs to be contained in the configuration control message.

In Step S109, after receiving the configuration control message, the second network equipment packetizes the resources of the request. The packetization of the resources required to be sent with a compression algorithm in advance is advantageous to the data transmission between networks.

In Step S110, the second network equipment directly sends the packetized resources to the first network equipment through a standard VOIP protocol communication in the form of IP data packets. The standard VOIP protocol communication between the first network equipment and the second network equipment includes SIP, H.323, MGCP, H.248, and the like.

In addition, locally used resources may also be set in the network equipment. The purpose of setting the local resources in the network equipment is mainly to ensure the local communication. On the premise that the local communication is ensured, resources are provided to other network equipments for use of the communication thereof. For example, a certain kind of resources of which the quantity is five is set in the network equipment through identification or by other setting methods. Then, the five resources are for the use of local communication. When the quantity of this kind of resources is smaller than 5, the availability of this kind of resources in the resource message reported to the server is "null" or reported as "non-idle."

In the method according to the embodiment of the invention, the server performs a resource configuration on a network equipment in the network according to a resource requirement of the network equipment and updated resource configuration information. As all the resource configuration information on the server is updated resource configuration information at each resource configuration, by implementing the embodiment of the invention, the number of lookups for the resources is reduced and the process thereof is shortened, thereby achieving an effective resource allocation. In the case that an update frequency is fast enough, a search for resources is realized by one lookup. With such dynamic resource configuration information, the resource allocation is performed quickly and the waste of processing capacity of the server is avoided effectively.

Those of ordinary skill in the art should understand that all or a part of the steps of the method according to the embodiments of the invention may be implemented through hardware related to program instructions. The program may be stored in a computer readable storage medium. When the program is run, the steps of the method according to the embodiments of the invention are performed. The storage medium may be any medium that is capable of storing program codes, such as a read-only memory (ROM), a random access memory (RAM), a magnetic disk, or an optical disk.

The above merely describes preferred embodiments of the present invention, and does not intend to limit the claims of the invention. Therefore, equivalent variations made according to the claims of the invention still fall within the scope of the present invention.

What is claimed is:

1. A resource configuration method, comprising:
   automatically updating, by a server, resource configuration information of the server according to resource registration information reported by each of network equipments in a network wherein the resource registration information is resorted s b each of network equipments in the network when a reporting period or time point for the resource registration information set in the network equipment is reached; and
   performing a resource configuration on one of the network equipments according to a resource requirement request of the network equipment and the updated resource configuration information, wherein the resource configuration information comprises the resource registration information reported by each of the network equipments in the network, the resource registration information comprises a resource type, a resource availability, and an equipment ID of the network equipment containing resources, and the resource type includes at least one of the following: sound, fax, conference, video and picture,
   wherein the performing the resource configuration on the network equipment according to the resource requirement request of the network equipment and the updated resource configuration information comprises:
   looking up the currently stored updated resource configuration information to determine whether a network equipment in the network possesses resources requested by a first network equipment according to a received resource requirement request sent by the first network equipment; and
   sending to network equipment a configuration control message indicating the network equipment to send the resources requested directly to the first network equipment if the network equipment possessing the resources requested exists in the network wherein the resources are packetized with a compression algorithm and the packetized resources are sent through a standard voice over Internet Protocol (VOIP) protocol communication in the form of IP data packets; and
   sending a request failed message to the first network equipment if the network equipment possessing the resources requested does not exist in the network.

2. The resource configuration method according to claim 1, the resource registration information is reported by each of the network equipments in the network also when a change of the resources is contained in the network equipment, or the network equipment is required to report a request of a resource possession condition of the network equipment.

3. The resource configuration method according to claim 2, before the automatically updating the resource configuration information of the network equipment, the method further comprising:
   judging whether the received resource registration information is contained in the current resource configuration information or not; and
   updating the resource configuration information of the network equipment if the received resource registration information is not contained in the current resource configuration information.

4. The resource configuration method according to claim 1, after the sending of the configuration control message the method further comprises:
   marking an availability of the resources of the network equipment to indicate that the resources are occupied.

5. The resource configuration method according to claim 1, before the looking up the currently stored resource configuration information to determine whether any network equipment possessing the resources requested exists in the network, the method further comprising:
   sending a resource updating request to each of the network equipments in the network to cause each of the network equipments to report a resource possession condition;
   receiving the resource registration information reported by each of the network equipments according to the resource updating request; and
   updating the currently stored resource configuration information according to the resource registration information reported by each of the network equipments.

6. A server, comprising:
   a resource update device, configured to update resource configuration information of the server according to resource registration information reported by each of network equipments in a network wherein the resource registration information is resorted s b each of network equipments in the network when a reporting period or time point for the resource registration information set in the network equipment is reached; and
   a configuration control device, configured to perform a resource configuration on the network equipment according to a resource requirement request of the network equipment and the resource configuration information updated by the resource update device, wherein the resource configuration information comprises the resource registration information, the resource registration information comprises a resource type, a resource availability, and an equipment ID of the network equipment containing resources, and the resource type includes at least one of the following: sound, fax, conference, video and picture, wherein the configuration control device comprises:

a second receiving device configured to receive a resource requirement request sent by a first network equipment;

a lookup device configured to look up currently stored resource configuration information to determine whether an network equipment in the network possesses the resources requested b the first network equipment according to the resource requirement request received by the second receiving device; and a sending device configured to send to a network equipment a configuration control message indicating the network equipment to send the resource requested directly to the first network equipment if the network includes the network equipment having the resources requested, wherein the resources are packetized with a compression algorithm and the packetized resources are sent through a standard voice over Internet Protocol (VOIP) protocol communication in the form of IP data packets; if the network does not include the network equipment having the resources requested send a request failed message to the first network equipment.

7. The server according to claim 6, further comprising:

a first receiving device, configured to receive resource registration information reported by the network equipment; and a first judgment device, configured to judge whether the resource registration information received by the receiving device is contained in currently stored resource configuration information or not;

wherein the resource update device automatically updates the resource configuration information of the server according to the resource registration information reported by the network equipment upon receiving a negative result output by the first judgment device.

8. The server according to claim 6, wherein the configuration control device further comprises:

a marking device, configured to mark an availability of the resources of the network equipment after the lookup device finds that the network equipment having the resources requested exists in the network, wherein the mark indicates that the resources are occupied.

9. A network equipment, comprising:

a detection device, configured to detect whether a triggering condition for reporting resource registration information is reached or not; and a sending device, configured to report the resource registration information of the network equipment to a server when the triggering condition is reached, wherein the resource registration information comprises a resource type, a resource availability, and an equipment ID of the network equipment containing resources, and the resource type includes at least one of the following: sound, fax, conference, video and picture;

the sending device is further configured to, after the server sends to the network equipment a configuration control message indicating the network equipment to directly send resources to a first network equipment packetize the resources required by the first network equipment with a compression algorithm and directly send the packetized resources to the first network equipment through a standard voice over Internet Protocol (VOIP) protocol communication in the form of IP data packets wherein the server sends to the network equipment the configuration control message when the server looks up a currently stored updated resource configuration information and determines the network equipment possesses the resources required by the first network equipment and the detection device comprises a second detection device, configured to detect whether a reporting period or time point for the resource registration information set in the network equipment is reached or not, and notify the sending device to report the resource registration information of the network equipment to the server when the reporting period or time point for the resource registration information set in the network equipment is reached.

10. The network equipment according to claim 9, the detection device further comprises at least one of the following devices:

a first detection device, configured to detect whether the resources contained in the network equipment change or not, and notify the sending device to report the resource registration information of the network equipment to the server when the resources contained in the equipment change; and a third detection device, configured to detect whether the network equipment receives a request that requires the network equipment to report a resource possession condition thereof, and notify the sending device to report the resource registration information of the network equipment to the server when the network equipment receives the request.

11. The resource configuration method according to claim 2, the reporting period is every 100ms and the time point is at 12 o'clock every day.

12. The resource configuration method according to claim 2, the change of the resources contained in the network equipment comprises a change of the quantity of the resources, a change of the resource percentage, a change of a resource status from idle to occupied.

\* \* \* \* \*

UNITED STATES PATENT AND TRADEMARK OFFICE
CERTIFICATE OF CORRECTION

| | |
|---|---|
| PATENT NO. | : 8,631,098 B2 |
| APPLICATION NO. | : 12/545489 |
| DATED | : January 14, 2014 |
| INVENTOR(S) | : Lei Tang |

Page 1 of 1

It is certified that error appears in the above-identified patent and that said Letters Patent is hereby corrected as shown below:

In the Claims

Column 11, Claim 1, line 47 "information is resorted s b each of" should read

-- information is reported by each of --.

Column 12, Claim 1, line 5 "sending to network equipment" should read

-- sending to the network equipment --.

Column 12, Claim 6, line 59 "information is resorted s b each of" should read

-- information is reported by each of --.

Column 13, Claim 6, line 13 "whether an network" should read

-- whether any network --.

Column 13, Claim 6, line 14 "requested b the first" should read

-- requested by the first --.

Signed and Sealed this
Fifteenth Day of April, 2014

Michelle K. Lee
*Deputy Director of the United States Patent and Trademark Office*